(12) United States Patent
Gibson

(10) Patent No.: US 6,678,264 B1
(45) Date of Patent: Jan. 13, 2004

(54) ESTABLISHING CONNECTIONS WITH A PRE-SPECIFIED QUALITY OF SERVICE ACROSS A COMMUNICATION NETWORK

(75) Inventor: Mark Robert Gibson, Herts (GB)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/345,069

(22) Filed: Jun. 30, 1999

(51) Int. Cl.[7] .............................................. H04L 12/66
(52) U.S. Cl. ...................................................... 370/352
(58) Field of Search .......................... 370/352, 395–398, 370/238, 338, 214–217, 389, 231, 355, 390, 380, 417; 709/201, 238–242; 455/433–439, 466, 450–456, 440; 714/4

(56) References Cited

U.S. PATENT DOCUMENTS

| | | | | |
|---|---|---|---|---|
| 5,504,935 A | * | 4/1996 | Vercauteren | 455/438 |
| 5,537,532 A | * | 7/1996 | Chng et al. | 714/4 |
| 5,832,197 A | * | 11/1998 | Houji | 714/4 |
| 5,987,028 A | * | 11/1999 | Yang et al. | 370/380 |
| 6,144,661 A | * | 11/2000 | Katsube et al. | 370/390 |
| 6,246,669 B1 | * | 6/2001 | Chevalier et al. | 370/238 |
| 6,377,579 B1 | * | 4/2002 | Ofek | 370/395 |
| 6,385,198 B1 | * | 5/2002 | Ofek et al. | 370/389 |
| 6,385,454 B1 | * | 5/2002 | Bahl et al. | 455/450 |
| 6,442,158 B1 | * | 8/2002 | Beser | 370/352 |

* cited by examiner

*Primary Examiner*—Chi Pham
*Assistant Examiner*—Prenell Jones
(74) *Attorney, Agent, or Firm*—Barnes & Thornburg

(57) ABSTRACT

On receipt of a request for a communication session over a communications network, such as an Internet Protocol communications network, a method of establishing a path for this session which provides a guaranteed quality of service is described. In a preferred example the communications network is an MPLS network and the method uses a modified version of the SIP messaging protocol. A number of possible paths for the communication session are identified and ranked according to factors such as traffic levels. Bandwidth along a chosen path is reserved and a messaging protocol such as CR-LDP used to establish this reserved path for the communication session. An advertising mechanism is used to provide entities in the network with information about topology and traffic levels. This enables the ranks to be determined effectively. The communications network has an overlay network of high capacity paths established on it. By arranging for communication sessions to preferably be established using these pre-determined high capacity paths the complexity of the topology information required is reduced.

19 Claims, 10 Drawing Sheets

US 6,678,264 B1

ESTABLISHING CONNECTIONS WITH A PRE-SPECIFIED QUALITY OF SERVICE ACROSS A COMMUNICATION NETWORK

BACKGROUND OF THE INVENTION

1. Field of the Invention

This invention relates to a method of establishing a connection between two endpoints in a communications network such that the connection provides a pre-specified quality of service for a specified communication session. The invention also relates to a communications network within which this method is implemented and also to a computer program for controlling a communications network in order to implement the method.

2. Description of the Prior Art

A current issue in the field of communications networks is the provision of guaranteed quality of service for transmission of internet protocol traffic. Quality of service is an important factor; customers require a good quality of service for message transmission especially for real-time applications such as video conferencing and voice. As well as this many customers require a particular level of quality of service to be guaranteed; if quality of service drops below a certain level and transmission is interrupted or noisy this may be acceptable in some situations but unacceptable in others. If particular levels of quality of service can be guaranteed this is particularly advantageous.

One approach that has been used is to prioritise individual transmissions that are sent over the network. For example, a system known as "DiffServ" allows messages to be marked to indicate their priority. Nodes in a communications network are then arranged to process high priority messages first. This enables high priority messages to be processed quickly but it does not provide a guaranteed level of quality of service.

Another approach has been to reserve bandwidth over a particular route in a communications network. However, systems that use this approach (for example RSVP Resource reSerVation Protocol) typically are poor at implementing aggregation mechanisms—for example they cannot easily combine a number of separate sessions over the same route, each must have its own reservation. Another shortcoming is that they also typically only allow the called party to reserve bandwidth that is required to host a communication session. This does not allow the calling party to specify their requirements and this is problematic, especially because the calling party is typically the party which incurs costs for a call.

Multi Protocol Label Switching (MPLS) is a standard messaging protocol that is suitable for carrying Internet Protocol traffic over communications network s such as Asynchronous Transfer Mode (ATM) networks and Frame Relay networks.

Constraint-based Routing Label Distribution Protocol (CR-LDP) is also a standard messaging protocol (CR-LDP is defined in Internet Draft: draft-ietf-mpls-cr-ldp-01.txt) that is suitable for use with communications networks that use MPLS. Mechanisms such as CR-LDP allow MPLS the ability to set-up paths between two endpoints over a list of routers, where these paths have ATM-like traffic requirements. However, there is no well-defined mechanism for the choice of the routers in this path that makes full use of the ATM-like traffic parameters. The only existing mechanism (QOSPF Quality of Service Open Shortest Path First) allows routing only in terms of advertised router speed and congestion. In tandem, QOSPF is unable to make the fullest use of CR-LDP as it cannot make use of the detailed traffic descriptions used in CR-LDP; neither can it provide detailed route information. As well as this QOSPF is not able to ensure a connection over a suggested route.

It is accordingly an object of the present invention to provide a method of establishing a connection between two endpoints in a communications network, such that the connection provides a pre-specified quality of service, for a specified communication sesion, which overcomes or at least mitigates one or more of the problems noted above.

SUMMARY OF THE INVENTION

Further benefits and advantages of the invention will become apparent from a consideration of the following detailed description given with reference to the accompanying drawings, which specify and show preferred embodiments of the invention.

According to an aspect of the present invention there is provided a method of establishing a connection between two endpoints in a communications network such that a specified level of quality of service is given for a specified communication session using the established connection, said method comprising the steps of:

(i) determining a plurality of possible paths between the endpoints;

(ii) determining a measure of preference for each of said possible paths on the basis of information about the communications network and information about the specified communication session;

(iii) reserving bandwidth along the most preferred path according to said measures of preference; and (iv) establishing a connection over said most preferred path.

A corresponding communications network is provided comprising at lea:3t two endpoints between which it is desired to establish a connection such that a specified level of quality of service is given for a specified communication session, said communications network comprising:

(i) a processor arranged to determine a plurality of possible paths between the endpoints;

(ii) a determiner arranged to determine a measure of preference for each of said possible paths on the basis of information about the communications network and information about the specified communication session;

(iii) a reservation mechanism arranged to reserve bandwidth along the most preferred path according to said measures of preference; and (iv) a connection mechanism arranged to establish a connection over said most preferred path.

A computer program stored on a computer readable medium is also provided, said computer program being for controlling a communications network comprising at least two endpoints, said computer program being arranged to control said communications network such that:

(i) a plurality of possible paths between the endpoints is determined;

(ii) a measure of preference for each of said possible paths is determined on the basis of information about the communications network and information about a specified communication session;

(iii) bandwidth is reserved along the most preferred path according to said measures of preference; and (iv) a connection over said most preferred path is established such that a specified level of quality of service is given for the specified communication session.

This provides the advantage that a communications session is established which has a guaranteed quality of service. Switch virtual circuit equivalency is effectively given for a communications network which can be an internet protocol based communications network such as an MPLS network.

Preferably, said step (ii) of determining a measure of preference for each of said possible paths further comprises the steps of:
  (i) for each of said possible paths, determining a first set of measures of preference on the basis of information about a region of the communications network around a first one of the two endpoints; and
  (ii) for each of said possible paths, determining a second set of measures of preference on the basis of information about a second region of the communications network around a second one of the two endpoints.

This provides the advantage that information about the communications network is only required for two regions of the communications network; this simplifies the method and enables it to operate quickly.

Preferably, said communications network comprises a plurality of nodes connected together by links and said method further comprises the step of configuring the communications network such that the links between a first plurality of nodes are of a pre-determined capacity such that in use each of said links between the first plurality of nodes is capable of sustaining a plurality of separate communication sessions. By provisioning the communications network in this way high capacity routes which act as "motorways" are created. By using these high capacity routes, the topology information required to implement the method is reduced. This simplifies the method and makes it faster to operate.

According to another aspect of the present invention there is provided, an entity for use in a communications network comprising at least two endpoints between which it is desired to establish a connection such that a specified level of quality of service is given for a specified communication session, said entity being associated with one of said endpoints and comprising:
  (i) a memory containing information about the topology of at least part of the communications network;
  (ii) an input arranged to receive a request for a specified communication session;
  (iii) an output arranged to issue a plurality of request messages in response to a request for a specified communication session; each of said request messages comprising information about the specified communication session.

For example said entity may be an admission manager. The entity provides a means by which request messages may be issued, each with its own measure of preference, in order to implement an improved SIP type method described herein.

According to another aspect of the present invention these is provided an entity for use in a communications network comprising at least two endpoints between which it is desired to establish a connection such that a specified level of quality of service is given for a specified communication session, said entity being associated with one or more nodes in said communications network and comprising:
  (i) a monitor for monitoring the available bandwidth in each of the links emanating from said associated nodes; and
  (ii) an advertisement mechanism for advertising said monitored available bandwidth.

For example, the entity may be a connection manager. The entity provides a means by which traffic levels in the network are advertised and this helps to implement an improved SIP type method described herein.

DETAILED DESCRIPTION OF THE INVENTION

Embodiments of the present invention are described below by way of example only. These examples represent the best ways of putting the invention into practice that are currently known to the Applicant although they are not the only ways in which this could be achieved.

Figure 1:
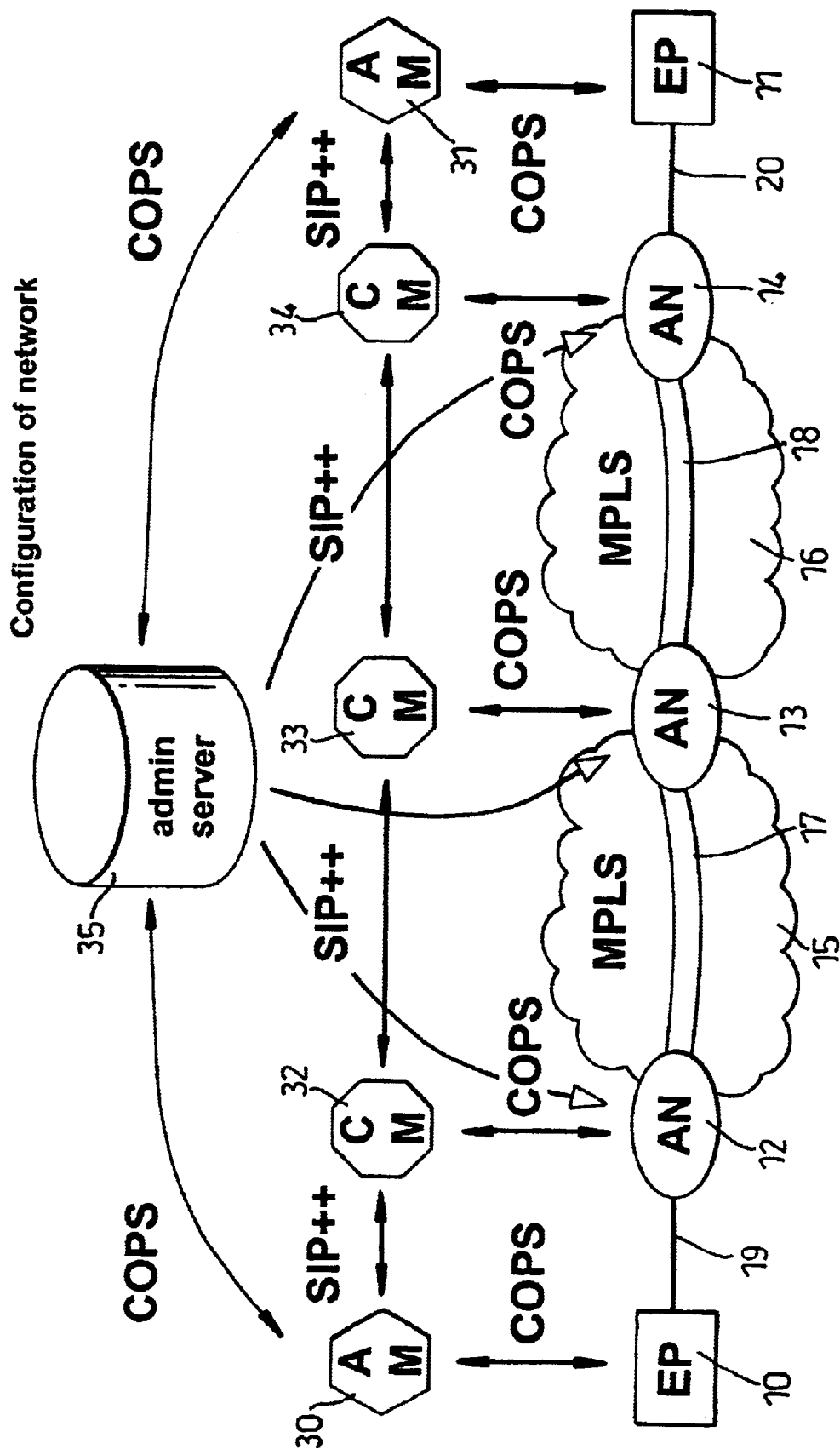
FIG. 1 is a schematic diagram of a communications network.

FIG. 1 is a schematic diagram of a communications network. A first endpoint 10 is connected to another endpoint 11 via a communications network which comprises a plurality of nodes that are connected by links. These nodes include three abstract nodes 12, 13, 14 and many other nodes which are not shown individually but which are represented by cloud shapes 15, 16 between the abstract nodes. These cloud shapes 17, 18 are intended to represent parts of the communications network which in one embodiment is an MPLS network.

Links 17, 18 are provided and these connect the abstract nodes 12, 13, 14 in series. Links 19, 20 are also provided to connect each endpoint 10, 11 to an abstract node and thus form a path or tunnel between the endpoints. However, this path from the first endpoint 10, via link 19 to abstract node 12 which is connected in series to abstract nodes 13 and 14, and then via link 20 to the second endpoint 11, is only one of many possible paths over the communications network which connect the two endpoints 10, 11. These other paths are not explicitly shown in FIG. 1 but are intended to be represented by the presence of clouds 15, 16.

Data or messages which are transmitted over the communications network can be thought of as comprising two types. First, customer data or messages such as video signals, voice signals or email messages and second, control data or messages. This control data functions to help manage the communications network; for example, control messages may comprise signals broadcast by a node in the communications network to advertise its presence or its failure. The method of using the control messages is defined by the type of messaging protocol(s) used.

In a preferred embodiment of the present invention, the MPLS standard messaging protocol is used in conjunction with the CR-LDP messaging protocol to help manage the communications network comprising the endpoints 10, 11, the abstract nodes 12, 13, 14, the clouds of nodes 15, 16 and the links between these. However, as described CR-LDP, while able to make quality of service reservations across known paths, is unable to determine these paths itself. In the present invention additional components and messaging protocols are provided in order to determine and reserve guaranteed quality of service for particular connections for particular paths over the network.

These additional components comprise an administrative server 35, admission managers 30, 31 and connection managers 32, 33, 34. The additional messaging protocols include the standard Common Open Policy Service (COPS) messaging protocol and a modified version of the standard IETF SIP (Session Initiation Protocol) RFC2543 protocol although these are all examples of preferred messaging protocols; any suitable messaging protocols may be used. The modified version of SIP is designed to work in conjunction with COPS, CR-LDP and MPLS, although it could be designed to work with similar messaging protocols to perform the same function. This modified version of SIP will hereinafter be referred to as "SIP++".

The invention provides Switch Virtual Circuit (SVC) admission control equivalency with guaranteed quality of service on an MPLS or similar communications network. An SVC is a path over a communications network between two endpoints which is effectively dedicated for a particular communication session. These SVCs may be used to carry one or more communication sessions. A brief "overview" of the manner in which this is achieved is now described.

When a user requests a connection for a communication session this request is passed to an endpoint to which a terminal accessed by the user is connected. Means is provided to determine possible paths for the required connection together with measures of preference for these possible paths. The measures of preference (for example, ranks) are determined on the basis of factors such as traffic levels in the network, length of path, and available capacities. One path is chosen on the basis of the measures of preference. For example, a path with the highest rank may be chosen and reserved for the requested communication session. This gives a reserved path which can be used to provide a guaranteed quality of service for a particular communication session. Any suitable measure of preference such as a score, percentage value or rank may be used.

In an embodiment of the invention a ranking mechanism is used to select from the set of suitable paths, the route a new session will use to traverse an MPLS network. This set of paths and their ranking varies with network load.

In order that the ranks may provide an effective means for choosing between possible paths an advertising mechanism is provided which allows entities in the communications network to gain information about traffic levels, topology of the network and other factors. This information can then be used to help make the decision about which path to choose. The advertisement mechanism allows the system to choose routes best suited to the session being established. Two methods are proposed: explicit registration or by passively piggybacking information on path setup messages. The rate of advertisement is a function of the rate of session set-up.

As well as an advertising mechanism, in order to reduce the complexity of choosing a path, a mechanism is provided whereby an overlay network is configured to provide a set of high capacity routes across the MPLS clouds which function as "trunk" routes or "motorways". An arrangement is then made that communication sessions are preferably established using these pre-determined high capacity routes. This helps to reduce the topology information needed to establish a path across a communications network. By using a constrained set of paths between the routers that comprise the MPLS network, the set of routes is constrained to reduce the total topology information needed to route across the network.

Referring again to FIG. 1, it can be seen that the admission managers 30, 31 and the connection managers 32, 33, 34 as well as the administrative server 35 are depicted above the MPLS network. The admission managers, connection managers and administrative server can be though of as a "management layer" of the communications network. However, this layer is not physically independent from the rest of the communications network. For example, the SIP++ protocol control messages may be transmitted over the same physical links as the user information during communication sessions.

Each endpoint 10, 11 is associated with an admission manager 30, 31 and each abstract node 12, 13, 14 is associated with a connection manager 32, 33, 34. As indicated in FIG. 1, communication between the endpoints and their associated admission managers and between the abstract nodes and their associated connection managers is carried out using the COPS protocol. Also, communication between the administrative server 35 and the admission managers 30, 31 or abstract nodes 12, 13, 14 takes place using the COPS protocol. The way in which this is achieved using the COPS protocol is described in more detail below. However, communication between the admission managers and connection managers takes place using SIP++.

The characteristics of some of the components of the communications network are now described:

Abstract Nodes 30, 31

Abstract nodes are a concept introduced by the CR-LDP protocol and represent one or more label switch routers (LSRs) which are connected together by links. By using a description equivalent to a subnet mask a whole group of LSRs can be referred to. A subnet mask is an Internet Protocol (IP) mechanism used to define a group of IP nodes by only using the first n bits of their 32-bit IP addresses, where n is less than 32. The abstract nodes run the CR-LDP protocol and remain unaware of the SIP++ protocol running between admission managers and connection managers. Each abstract node may be directly configured by the Administrative Server, which may instruct an abstract node to establish a path to another particular abstract node. In the case where a CR-LDP network is used this path is referred to as a label switch path (LSP). SIP++ or any other suitable messaging protocol used provides a means of determining which of the label switch routers in an abstract node a path should be routed through.

By using abstract nodes when selecting path candidates for a new session it is possible to be presented with a set of diverse routes. This provides the advantage that different routes over the network can be utilised and this is especially helpful if it is required to "spread load" over the network and if problems occur in localised regions of the network.

Endpoints 10, 11

An endpoint is any node in the communications network through which a user may request a communication session on the communications network. For example, in the case that an MPLS communications network is used an endpoint can be any MPLS device; either an MPLS enabled terminal or a router at the edge of the network. New communication sessions requested by an endpoint are sent to an admission manager that is associated with the endpoint. That admission manager then uses the SIP++ protocol and a path for the requested session is determined and reserved in order to guarantee the requested quality of service. Once the admission manager has completed this task, the user request is validated and the validation communicated to the endpoint using the COPS protocol. Together with the validation, details of the chosen, reserved path are provided to the endpoint together with an identifier for the reserved path. If the request for a new session is granted, the endpoint runs the CRLDP protocol using the exact same parameters that were used in the COPS request for a communication session together with the details of the chosen, reserved path. The CR-LDP protocol then establishes a path for the communication session according to the standard CR-LDP method described below. Each endpoint is therefore effectively unaware of the SIP++ protocol running between the admission managers and connection managers.

Admission Managers 30, 31

Each admission manager is responsible for maintaining network topology information and using this to select a route across the network. When an admission manager receives a request for a communication session from an endpoint 10, 11 it issues a plurality of path requests, which in a preferred example of the SIP++ protocol are referred to as INVITE messages. These path requests are control messages whose function is to request and determine possible paths between the required endpoints. In order to issue these path requests effectively, an admission manager needs to maintain accurate topological information about at least part of the communications network. Route advertisements are broadcast by entities in the communications network and an admission manager processes all the route advertisements it receives. This enables the admission manager to build up a map of all the reachable nodes on the MPLS network and their availability over time. An admission manager also monitors the bandwidth of connections to edge abstract nodes for the endpoint EP that it is associated with. (An edge abstract node is an abstract node that is positioned towards the edge of a communications network.) In this way an admission manager effectively provides admission control to the communication network. Communication between an admission manager and its associated endpoint is via an interface such as a COPS interface. An interface to the administrative server 35 is also provided, which may be a COPS interface. This allows endpoints to request new tunnels or paths (for example new "trunk" routes) in the communications network such as an MPLS network. An admission manager is also arranged to respond to INVITE messages issued by other admission managers. This is described in more detail below.

Connection Managers

Each connection manager is associated with an abstract node and as described above an abstract node may comprise one or more Label Switch Routers LSRs. However, it is not essential for all label switch routers to be associated with a connection manager.

Connections from these label switch routers to other abstract nodes are termed "label switch paths" (LSPs). Each connection manager monitors the bandwidth used in each of the label switch paths that emanate from the label switch router (or group of label switch routers) which it is associated with (or managing). It also is responsible for advertising the level of congestion in these label switch paths to other administrative elements (such as other connection managers and admission managers) on a slow but regular basis.

A connection manager also keeps a record of the destination abstract node for each of the label switch paths that it is monitoring. This information is also advertised by the connection manager. A connection manager also uses a COPS interface from the abstract node it is monitoring to allow registration of new label switch paths or a change in parameters of an existing label switch path.

Administrative Server

An administrative server 35 is used to provision paths in the communications network upon initialisation. For example, this involves establishing the label switch paths that the SIP++ protocol routes over. It is also used to change the characteristics of an existing path or introduce a new one. Although pictured as a single entity in FIG. 1, an administrative server 35 may take the form of multiple servers that administer their local area.

An Administrative Server is able to communicate directly with any label switch router in a 'known' abstract node. It uses CR-LDP over this interface to provision high capacity label switch paths between these label switch routers via any number of intermediate label switch routers. Typically this will be through label switch routers with no associated connection manager, though this need not necessarily be the case. An administrative server has a much more detailed view of the topology of the intermediate MPLS network than the endpoints attached to it. (The intermediate MPLS network being that part of the communications network which is not local to the endpoints.) By pre-provisioning label switch paths of high capacity the administrative server constrains the number of possible routes between two endpoints for a proposed communication session of a given capacity. This reduces the level of detail needed to make routing decisions.

An Administrative Server may also add new paths or change the characteristics of an existing path during the operation of the network. This may either be initiated by the network provider or via a request mechanism which is now described.

Request Mechanism

The Administrative Server 35 has a COPS interface to all the admission managers at the edge of the network. This interface is used by those admission managers to request new high capacity label switch paths across the MPLS network, or to request a change in the capacity of an existing LSP.

Figure 2:
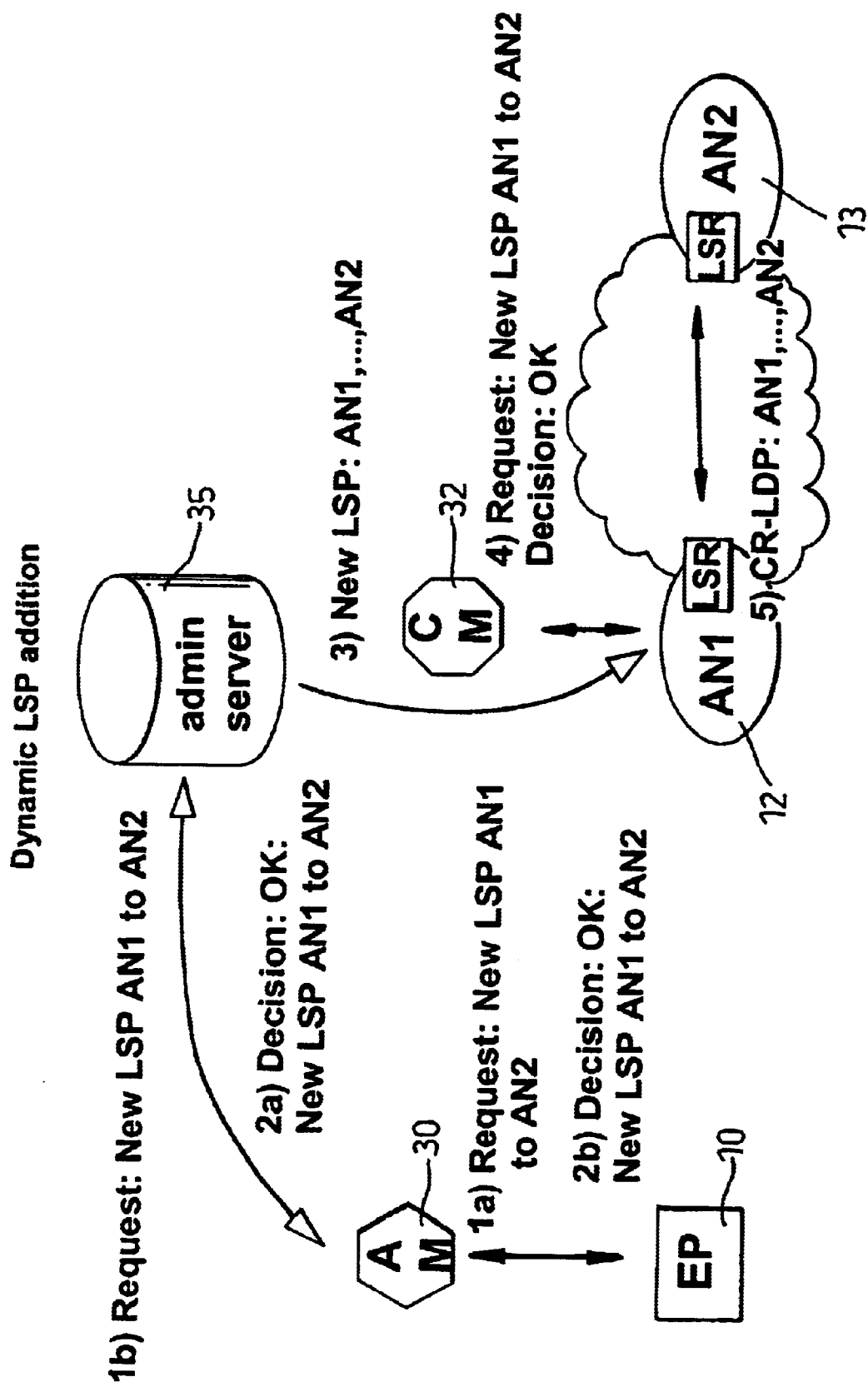
FIG. 2 is a flow diagram of the process of dynamic label switch path addition.

FIG. 2 shows the process of requesting a new LSP. Either an Endpoint 10 or an Admission Manager 35 issues a Request for a new route between two Abstract Nodes 12, 13 in the MPLS network. This is responded to by the Administrative Server, with the acceptance situation being illustrated in FIG. 2. The Administrative Server now signals to one of the specified abstract nodes AN1, 12 that it should set-up a path to the other abstract node AN2, 13. In the case that the abstract nodes represent a group of label switch routers, the administrative server specifies a particular label switch router within each abstract node.

The first abstract node 12 then registers the requested new path and its characteristics with its Connection Manager 32.

This is achieved by issuing a COPS Request message over the COPS interface. The connection manager 32 does not refuse this Request under normal operation and issues a COPS Decision message to this effect. Once a Decision is received by the first abstract node 12, this abstract node proceeds to use CR-LDP to establish the connection to the other specified abstract node. Once the new route is established, the connection manager 32 begins to advertise its presence and the new route can be used immediately in the path for a new session.

SIP++

Figure 3:
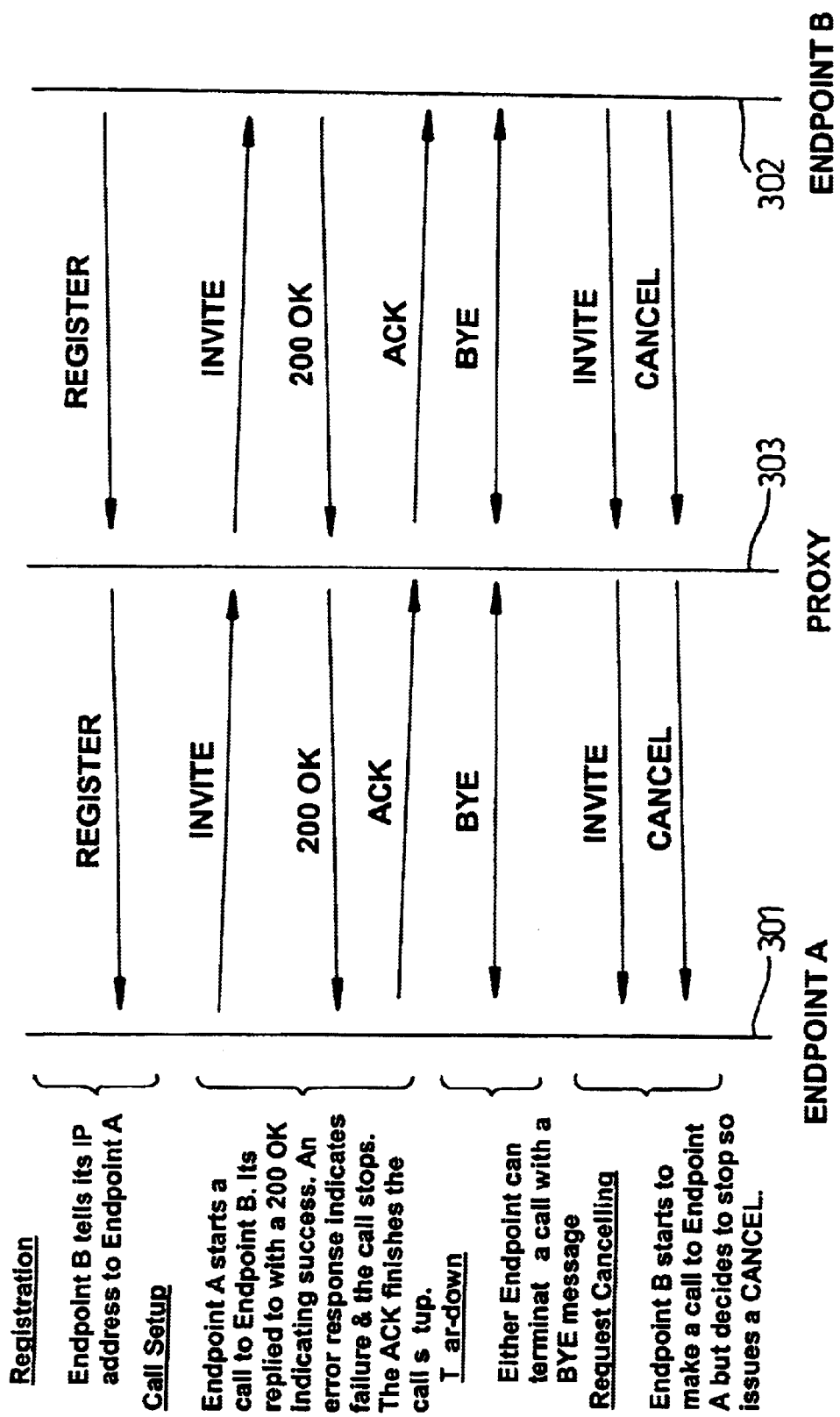
FIG. 3 is a flow diagram of basic SIP operation with a proxy.

A simplified SIP++ messaging diagram is provided in FIG. 3, with a brief explanation of the role of each message. These messages are similar to those of SIP but the contents of the messages are modified as compared to SIP. Vertical lines 301 and 302 in FIG. 3 represent two endpoints between which a proxy is located, which is represented a vertical line 303. Messages are sent between these endpoints and the proxy as indicated by the arrows between the vertical lines.

SIP++ Registration Method

The registration method involves an endpoint, such as endpoint B represented by vertical line 302, sending its internet protocol address to another endpoint, such as end point A represented by vertical line 301.

SIP++ Call Set-up Method

The call-set up method involves an INVITE message being sent from an originating endpoint 301 to the destination endpoint 302. If this INVITE is accepted by the destination endpoint 302 a so called 200 OK message is sent by the destination endpoint 302 to the originating endpoint 301. If the INVITE is not accepted an error response is sent in place of the 200 OK message. Once a 200 OK message is received by an originating endpoint an ACK message is sent returned to acknowledge receipt of the 200 OK message. This completes the call set-up.

SIP++ Tear Down Method

The tear down method involves either endpoint in a communications path terminating a call by issuing a BYE message to the other endpoint.

SIP++ request cancelling method

This method involves for example, endpoint B 302 starting to make a call to endpoint A 301 and then deciding not to make this call after all. In this situation, endpoint B is able to issue a CANCEL message to endpoint A.

The method of establishing a path for a communication session with a guaranteed quality of service is now described together with an overview of the SIP++ method. Full details of SIP++ are described later.

When a COPS Request is received at an admission manager (requesting a path for a communication session), then providing admission is granted by the admission manager, one or more INVITE messages are sent out by the admission manager. The SIP++ INVITE message extends the standard SIP INVITE message to include a new message body type. Each invite message contains a description of the requirements for the desired communication session. For example, the traffic characteristics which are used to establish the path by CR-LDP. A path description is contained within this new body to find a route across the MPLS network that the new session could use. For example, the path description can be a list of nodes which must be visited in sequence to cross the network and reach the required endpoint. Some of the nodes may be unknown and represented as wildcards in the list. Each potential path is also assigned a rank which indicates the admission manager's preference for the route.

For a given INVITE message, the path description is examined and the first reachable abstract node in the list identified. The INVITE message is then sent to the connection manager associated with that reachable abstract node. This is repeated for each INVITE message issued by the admission manager.

When a connection manager receives an INVITE message, it examines the information about the session requirements and next abstract node to see if it has a path to that abstract node and if it can accommodate the new session. There may be more than one path depending on how well defined the abstract node is (for example, if the next abstract node is represented in the path description by a wildcard). If the answer is yes to both questions, it adds the explicit address (such as an IP address) of the abstract node that it is associated with to the INVITE message. An identifier for the connection manager itself is also added to the INVITE message. This information is added to a route-record header field of the INVITE message.

The connection manager then makes a temporary reservation for the session and forwards the INVITE message to the next abstract node in the path description. (If there is more than one abstract node at the next stage of the path description, the INVITE message is "forked" as described below.) If there are insufficient resources or there is no label switch path to the next abstract node in the path description, the connection manager will respond with an error message. This process is repeated until the INVITE messages reach the destination endpoint.

The destination endpoint waits for and collates the incoming INVITE messages. When these INVITE messages were issued by the originating admission manager, they were each assigned a rank by that admission manager. This rank indicates the favourability of a particular path and is scored based on how congested the network appears to the originating admission manager. The rank or other measure of preference is also determined on the basis of factors such as the suitability of the returned path to the type of session being established based on, for example, the latency of the path when establishing a real-time session. The admission manager associated with the receiving endpoint now assigns its own rank to the paths specified in the Record-Route header of each received INVITE message. For each path, the rank from the originating admission manager and from the receiving admission manager is combined in any suitable way, for example by addition, convolution or multiplication. The path and associated INVITE message with the highest scoring rank is then chosen.

The receiving admission manager now forms a 200 OK response to the chosen INVITE message. The 200 OK response needs to be returned along the same path as the chosen INVITE message arrived. The path along which the chosen INVITE message arrived is known from the details of each abstract node passed on route. This information is taken from the Record-Route header of the chosen INVITE message and used to form a new path description for the 200 OK message. Also, the Record-Route header of the chosen INVITE message is copied into the 200 OK message. The 200 OK message is then sent back to the originating admission manager.

The 200 OK response now traverses the MPLS network back to the originating admission manager via all the connection managers on the selected path. As it does so, each of these connection managers converts its temporary reservation for the requested communication session into a permanent reservation. Shortly after the originating endpoint and admission manager have received the 200 OK response, all the other temporary reservations time-out.

Using this method, each endpoint need only be aware of the congestion locally yet it is possible to choose a path with the most favourable end-to-end congestion. Each admission manager and its associated endpoint are referred to as a "decision point". If the network is expanded to include many abstract nodes then it is possible to use intermediate decision points between the decision points associated with each endpoint. This helps to ensure that congestion information does not become too stale, and addresses the problem of congestion at locations distant from an endpoint being difficult to determine i.e. when there is no visibility of congestion from a given endpoint.

Having received the 200 OK response, the originating endpoint and its associated admission manager complete the setup with an ACK message. The ACK message needs to be sent back to the destination endpoint along the chosen route. The Route header for the ACK message is determined from the Record-Route header of the 200 OK message. The originating admission manager then sends the ACK message along the exact path chosen. It is not essential to use an ACK message; however, ACK messages are a required part of the SIP protocol and are therefore used in the present example, to reduce the modifications required to the SIP protocol in order to form the SIP++ protocol.

Path Selection Alternative

In a preferred embodiment, as described above, a soft state mechanism is used at each of the connection managers in the path that a successful INVITE message traverses. A short-lived reservation that holds the session bandwidth in each label switch path is made such that the bandwidth cannot be offered to other proposed communication sessions. This soft-state is confirmed by the final path decision message (e.g. 200 OK message) that turns this temporary reservation into a hard state. In the meantime the other reservations time out.

In this preferred embodiment there are two possible points at which the reservation can be made. If the INVITE message includes the rank for each suggested path then the receiving endpoint can make a decision as soon as it has received all the INVITE messages for a session. The 200 OK reply can then be routed over the selected path and used to reserve the bandwidth at each of the connection managers traversed. The final ACK in this case can be used to return any session identifying labels to the called endpoint.

In the other scheme, the originating admission manager sends no rank information in its INVITE messages. It waits for 200 OK responses from the called admission manager and assigns rank to each of the returned path alternatives. It then makes decision based on the ranks it has assigned and those it has received from the called admission manager. An ACK message is then used to traverse the chosen path and reserve the bandwidth at each of the connection managers it passes.

Alternative Reservation Options

Two other schemes for reservation of bandwidth at the connection managers along the chosen path across the MPLS network are now described.

In a first scheme the standard CR-LDP protocol is modified to include a new CR-LDP Type-Length-Value element (TLV) that defines the Call-ID of the SIP++ session that reserved the bandwidth. Alternatively a vendor specific TLV type within the standard CR-LDP is used. In this case, when the CR-LDP method is used to establish a path for the session (after the path has been reserved using the SIP++ protocol) the Call-ID is used to make sure that the CR-LDP method sets up the same path as that selected by SIP++. During the CR-LDP method to establish a path for the session, each label switch router in the path uses COPS to interrogate its associated connection manager with the Call-ID. This is done using COPS request messages. On request the connection manager returns the label switch path (of the reserved path chosen by SIP++) down which the session should be directed, using a COPS Decision message.

Alternatively, the connection manager uses a Synchronise State Request to signal a change in client (in this case label switch path) state with the update arriving in the form of the CR-LDP message itself. When this 'update' is received the label switch router responds with a Synchronise State Complete message. Using this method, each connection manager advertises the reserved path to its associated label switch router to ensure that the reserved path is used As an alternative to making a soft-state reservation permanent using an SIP++ message, Request messages sent by label switch routers to their associated connection managers can be used to make the reservation in the connection manager.

In the alternative method, on receipt of the Request containing the Call-ID of the session, the connection manager matches the Call-ID to the Call-ID of a previously received INVITE message and makes the reservation for the session. More details about SIP++

The INVITE method of SIP is re-used in SIP++ with a new body type, a changed use of the SIP INVITE method and a slightly changed header type.

The header type is the Record-Route header. It operates in essentially the same manner as in standard SIP but the manner in which it is filled in is different. The Record-Route header is used to log a set of nodes that all subsequent SIP responses must be routed through. Typically this is used by proxies to monitor session set-up.

Figure 4:
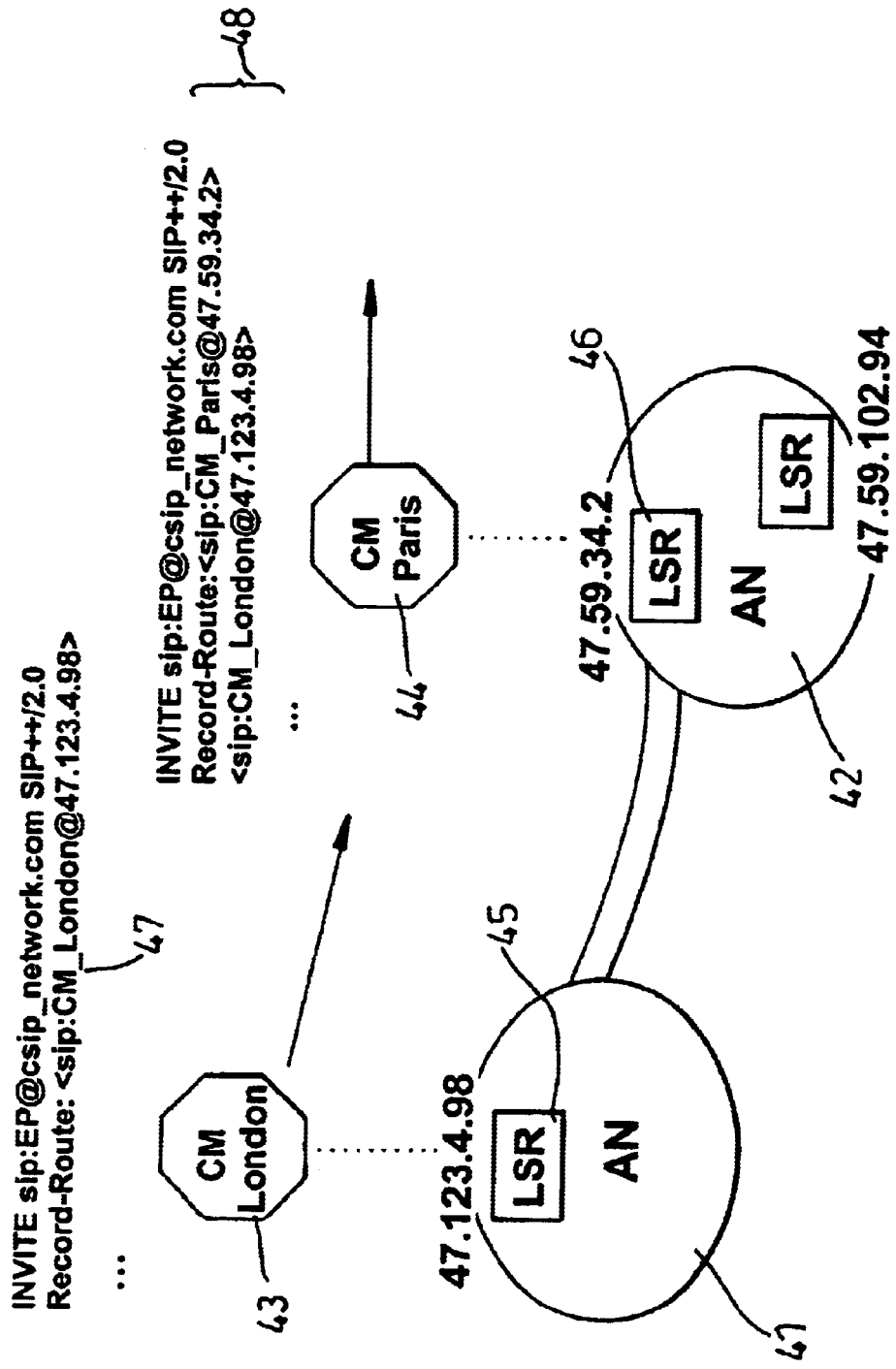
FIG. 4 is a flow diagram showing use of a record-route header to track a route.

Under SIP++ operation, when a connection manager receives an INVITE message, it appends a SIP-URL (Universal Resource Locator) of its identity to the Record-Route header. This identity consists of the name of the connection manager and the IP address of the label switch router it is administering e.g. sip:CM Harlow@1.2.3.4. Where CM_Harlow is the name of the connection manager and 1.2.3.4 is the IPv4 address of the label switch router. Each subsequent connection manager appends its SIP-URL to the front of the list of SIP-URLs. This process is illustrated in FIG. 4 which shows two connection managers 43, 44 together with their associated label switch routers 45, 46 which are each part of an abstract node 41, 42. One connection manager is called "CM London" and the other "CM Paris" as illustrated. For CM London, the IP address is 47.123.4.98 and for CM Paris, 47.59.34.2. The record-route header of an INVITE message received by first CM London and then CM Paris are shown 47, 48 and it can be seen that for CM Paris the SIP-URL for this connection manager has been appended to the front of the list of SIP-URLs. When a Route header is present in a SIP message it defines a set of nodes that the message must be routed through. A connection manager can thus be regarded as acting like a SIP Proxy.

The SIP++ message body introduces six new elements as compared to a standard SIP message body and these are now described.

Abstract Node Element.

This element is used to specify a particular abstract node. Parts of the specification for the abstract node can be "wildcarded" (for example, if it is required to find all possible routes which pass through an abstract node which meets certain specifications). The abstract node element uses the following notation: {prefix length, IP address}, where the prefix length acts like a subnet mask for the IP address field and specifies the number of bits, starting with the MSB (Most Significant Bit), of the IP address which are used to describe the Abstract Node. If a prefix length of 32 is used, the whole IP address is significant and this is termed an explicit. address. For example, {24, 47.209.3.1} defines an Abstract Node whose elements' IP addresses begin with 47.209.3 and {32, 47.209.3.1} defines an Abstract Node with the explicit address 47.209.3.1.

Another example is {0, 47.209.3.1} which defines an Abstract Node with no completely defined IP address. Use of the zero at the front of the element is equivalent to a wildcard value and useful when the originating endpoint has an incomplete view of a part of the network, or wishes to find out how many paths exist over a particular leg. A short form of the wildcard value, for example: {*,*} may also be used.

Path Element

This is a string of Abstract Node definitions—in 200 OK and ACK messages it is a string of explicit addresses. It contains. as many abstract node definitions as there are hops across the MPLS network to the destination endpoint. (A "hop" is a path between two abstract nodes) A path element has the following format: Path={{AN1}, {AN2}, {AN3}, . . . , {EP}} where the last element in the path is the explicit address of the destination endpoint (otherwise routing is impossible).

A path element may contain wildcard characters. However, to avoid unnecessarily large amounts of signalling, there are preferably no more than two successive wildcard addresses in a path definition. There may only ever be one path element per message body.

Rank Element

This is a score from 0–10 that indicates the preference an endpoint has for a particular path, with 10 being the favourite route. If a score of 0 is received for a particular path, this indicates that it is totally unacceptable and should not be used. An example of a rank element is: Rank=6.

Traffic Element

This element uses the exact set of parameters that the Traffic TLV in CR-LDP uses, namely: Peak Data Rate (PDR) Peak Burst Size (PBS); Committed Data Rate (CDR); Committed Burst Size (CBS); Excess Burst Size (EBS). All the rates are quoted in KBPS. An example of a traffic element is: Traffic={PDR=128, PBS=512, CDR=96, CBS=256, EBS=512}.

Label Element

This is used to convey any locally assigned path or "label" information from one endpoint to another; typically from the originating endpoint to the called endpoint. The session at the originating endpoint is mapped into a particular label switch path over its first hop with many other sessions. In order to allow differentiation at the called endpoint (and thus faster onward routing) a second label is inserted at the bottom of a label stack which remains unpopped until received by the called endpoint. Label elements are used by ACK messages only. Also, depending on the coupling between the endpoint and admission manager, label elements are only sent once CR-LDP negotiation is complete. An example of a label element is: Label=928.

Resource Class Element

This element is used to indicate the resource class of the session for the purposes of DiffServ support. An example of a resource class element is Class=42. It is not essential to use resource class elements if DiffServ support is not required.

Resource class elements may also be used to group sessions in a particular label switch path. Where multiple label switch paths exist between two abstract nodes, the selection of which of these to use for a new session can be made if each of these label switch paths carries a distinct set of Resource Classes. For example, a pre-configured path may be arranged to only carry a session whose resource class lies in the range 20–500. This also allows label switch paths to be tailored to suit particular session types.

The SIP++ protocol makes use of 4 of the main SIP methods in a new form, namely: INVITE; ACK; REGISTER and BYE. The operation of these methods in the SIP++ protocol is now described.

INVITE Method

One way in which the SIP++ INVITE method differs from the standard SIP INVITE method involves so called "forking". When the next abstract node in a path element results in a number of possible paths for the next hop, the INVITE message is duplicated and sent along each possible path. This is termed "forking". In SIP++ forking is only arranged to occur if the next-but-one abstract node is reachable through the next abstract node. However, in standard SIP forking does not rely on topological information; forked INVITE messages are simply sent down all possible paths when forked.

Figure 5:
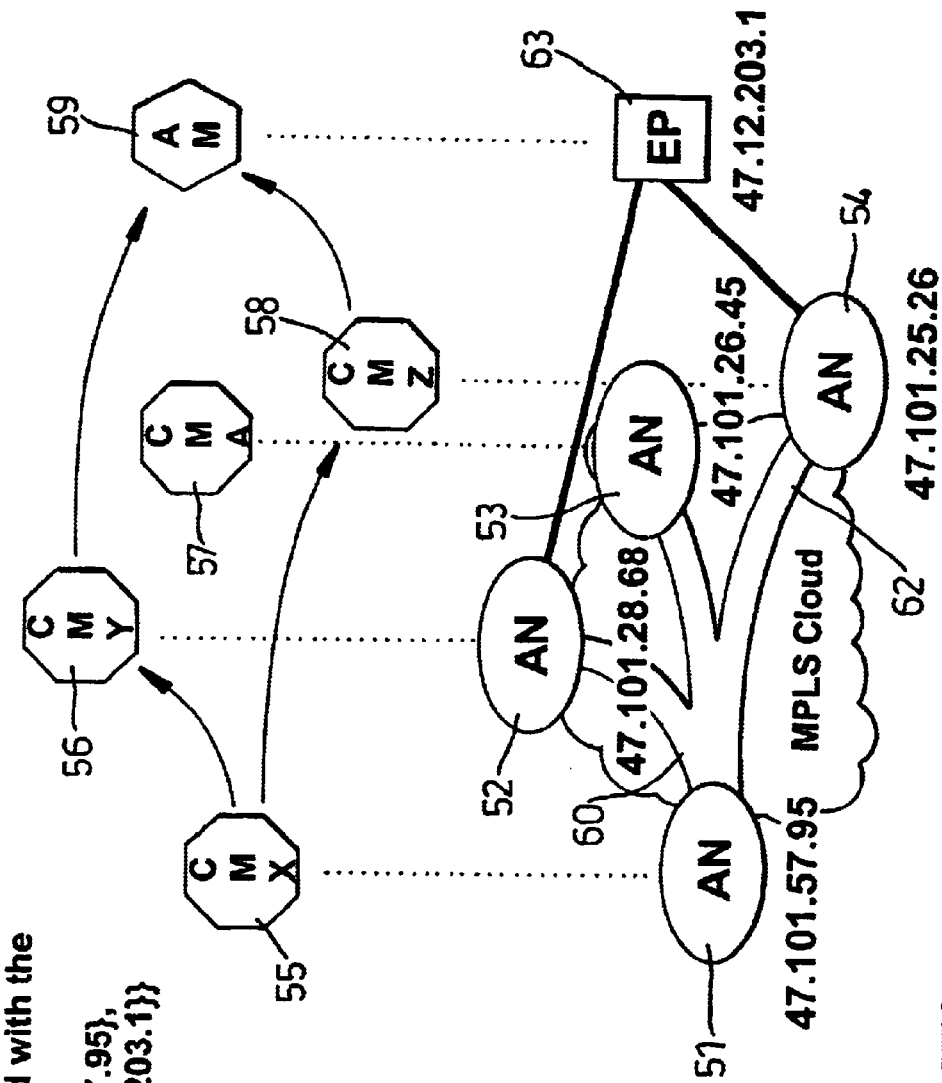
FIG. 5 is a flow diagram showing forking with non-explicit abstract nodes.

Forking in SIP++ is illustrated in FIG. 5. Four abstract nodes 51, 52, 53, 54 are illustrated each having an associated connection manager 55, 56, 57, 58. Connection manager X 55 receives an INVITE message with the next hop wildcarded. It has 3 label switch paths 60, 61, 62 down which it might fork the INVITE message. The connection manager X 55 therefore examines the next abstract node definition, in this case an endpoint 63 address. Having done this, CM X 55 realises that paths only exist to the destination endpoint 63 via the abstract nodes 52, 54 administered by connection manager Y 56 and connection manager Z 58. The INVITE message is thus only forked to these Connection Managers 56, 58 and not to connection manager A 57. This example illustrates the need for each Connection Manager to maintain topological information over two hops.

SIP++ permits multiple INVITE messages to be issued with the same Call-ID (but with an incremented identifier called a "Cseq"), without first receiving a 200 OK response for the first INVITE. However, under standard SIP operation, each INVITE message is issued sequentially and must be responded to either with an error or a 200 OK. On receipt of a 200 OK message by an admission manager or connection manager, the session described by the associated INVITE message is considered established and no further INVITE messages need to be sent. SIP++ allows a destination endpoint to choose a path from a number of INVITE messages and to respond with a single 200 OK message. To avoid confusion, each INVITE message whose path was not used is sent an error response indicating the path was not used. This error response contains the CSeq identifier of the unsuccessful INVITE message. It is a preferred embodiment that these Error messages be sent, though their omission has no detrimental effect to the operation of the protocol.

Figure 6:
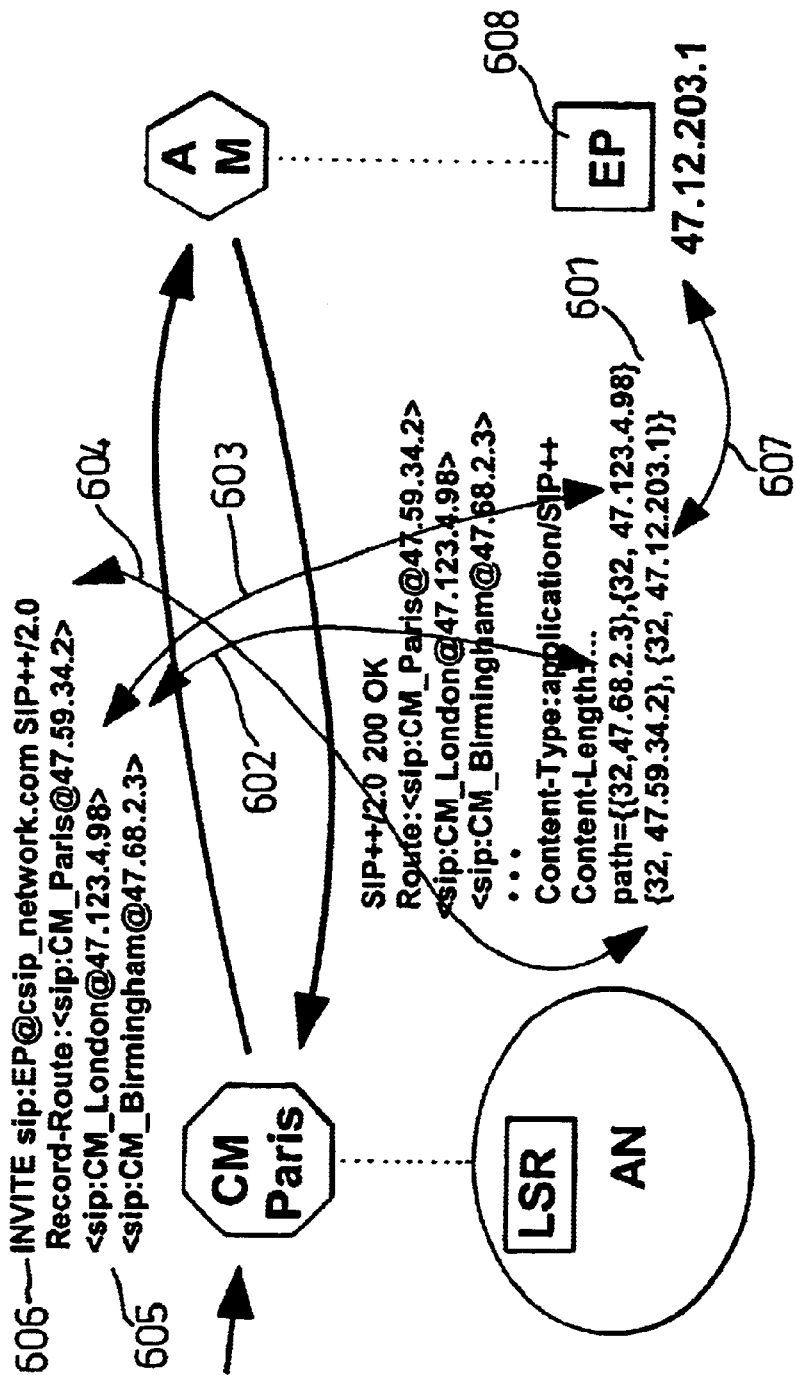
FIG. 6 is a flow diagram illustrating the process of forming a path element from a record-route header.

A 200 OK response issued by an admission manager includes the CSeq of the INVITE associated with the chosen path. As illustrated in FIG. 6 the body of the 200 OK message includes a path element 601 for the selected path. This is formed from the label switch path IP addresses 602, 603, 604 listed in the Record-Route header 605 of the INVITE message 606. These IP addresses are listed in the path element as explicit Abstract Nodes. They are retrieved in the order in which they were appended to the INVITE message, so that the left-most SIP-URI in the header gives the right-most abstract node in the path element. A destination endpoint 608 then adds its own IP address 607 to the path element.

The originating admission manager is able to correlate its successful requested path element that it sent with the actual path reserved, and store this for future use.

The number of INVITE messages which may be issued for a particular session depends on both the number of diverse routes an endpoint wishes to explore, and whether the originating endpoint receives a satisfactory response to an INVITE message. It is preferred that the number does not exceed about 5 INVITE messages.

Diverse routing can easily be achieved by issuing a number of concurrent INVITE messages for the same session. These use the same Call-ID but different CSeq value. The receiving endpoint then chooses whether to reply to all the INVITE messages with a single 200 OK message, or to reply with one 200 OK message per INVITE message received.

There therefore exists at least two mechanisms within SIP++ for diverse routing, firstly by using wildcard or short prefix abstract nodes, and secondly by sending multiple INVITE messages for the same session.

ACK Method

The ACK is used in the same way as in standard SIP. It is used to terminate an INVITE message as described above.

REGISTER Method

The REGISTER method is used to update the topology and congestion information in the network, and also to inform Connection Managers and Admission managers of the existence of a label switch path. When a label switch router receives a path set-up message from the administrative server, it sends a Request message over the COPS interface to its connection manager. This triggers the connection manager to broadcast a REGISTER message to all neighbouring connection managers that details the new path in terms of its size and the abstract nodes between which it exists. This initial advertising may either be to all neighbouring connection managers or just to those whose abstract nodes have a preferred label switch path to the newly configured abstract node. The REGISTER is then forwarded one hop further such that all connection managers and admission managers now have information about the topology of the network up to two hops away.

REGISTER messages are also used as periodical updates of the state of each label switch path. In this case, the information sent is the remaining free space in the label switch path and the abstract nodes between which the label switch path runs. These REGISTER messages are only sent to those connection managers whose abstract nodes have a direct connection to the sending connection manager's abstract node. The REGISTER messages are then forwarded over the next hop in the same manner. The distance over which they are sent can be limited using the Max-Forwards SIP header. The time period for these updates is arranged to be short enough that the topology and congestion information in the network does not become stale, but long enough that the network does not become flooded.

Congestion information may, additionally, be piggy-backed on INVITE and 200 OK messages. This involves attaching the congestion body type onto the end of the normal INVITE message. If such a mechanism is used, it restarts the REGISTER update timer every time an INVITE message is used in this way. The period for this mechanism may be on an every n packets basis, where n is small, for example 20. In this way, at times of heavy session set-up, and thus high flux in the network congestion state, more regular congestion information is exchanged. This mechanism is not used to notify a new label switch path—this is always achieved using the REGISTER method.

A REGISTER message is not forwarded along the label switch path that the message describes. Similarly, the congestion information attached to INVITE-and 200 OK messages does not describe the tunnel being traversed. In this way, congestion can always be fed upstream to provide negative feedback, control and network stability.

ERROR Messages

New error messages are needed for the SIP++ protocol. Five are needed and these have subtly different meanings:

1) 801 Congestion: LSP unable to take new session

2) 802 Congestion: LSP has reached its capacity—may be issued following a successful set-up 3) 803 Not available: LSP has temporary fault (other than it is congested)

4) 804 Not available: No such LSP exists.

5) 810 Path not used (in response to an unsuccessful INVITE)

BYE Method

BYE clears the reservation in each of the connection managers in the session path. The use of the previously established Route header ensures each connection manager is traversed and the Call-ID uniquely identifies the session. A BYE message is only sent once the session has cleared at the MPLS layer. A BYE message can be sent by an admission manager associated with either endpoint.

The COPS Protocol

In a preferred embodiment of the present invention, the standard COPS protocol is used for communication between various elements in a communications network as described above. However, other messaging protocols which perform the same function may also be used. The way in which the standard COPS protocol is used in an embodiment of the present invention is now described.

Figure 7:
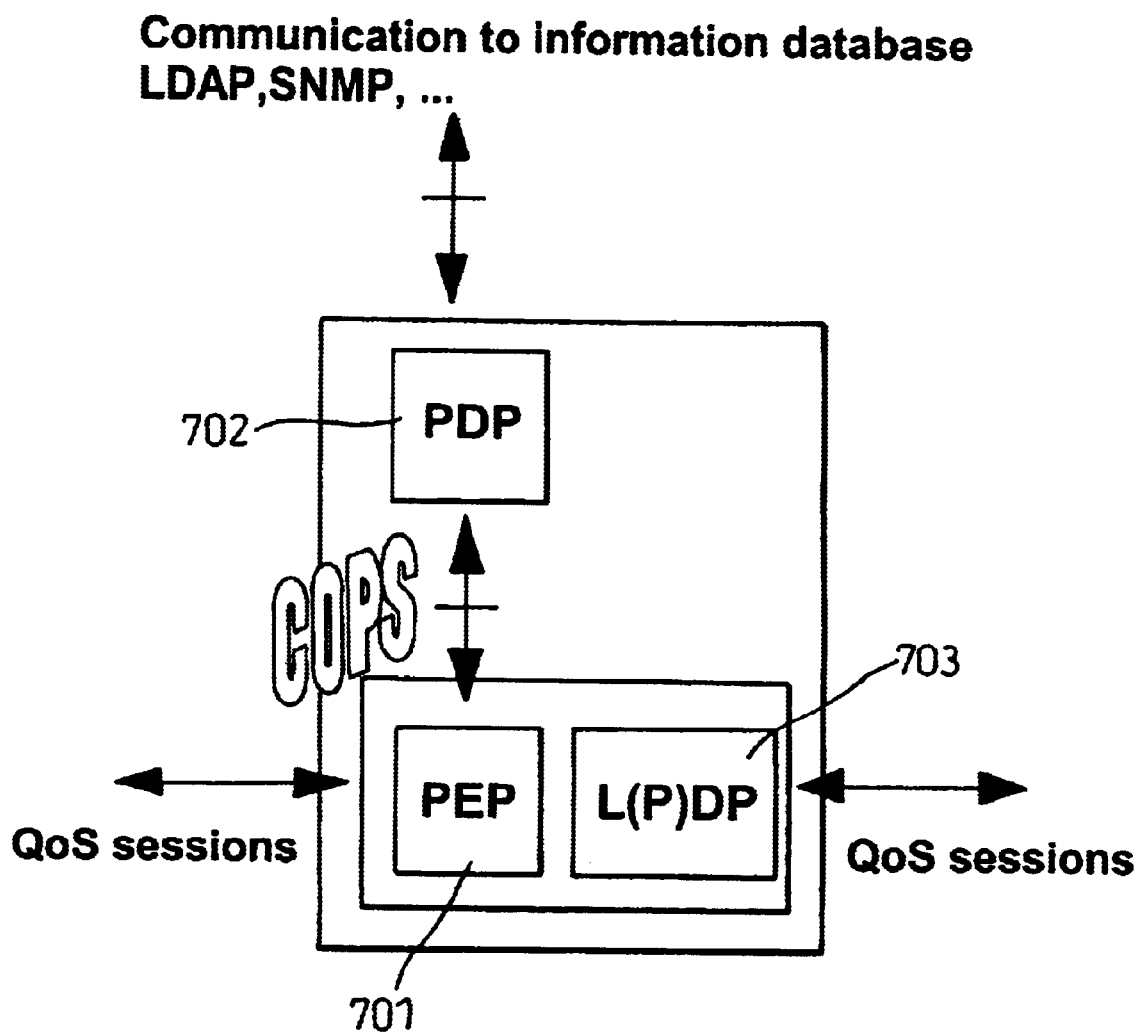
FIG. 7 illustrates a basic COPS model.

This protocol defines a client-server messaging mechanism that supports policy enforcement in a Quality of Service enabled network. The basic functional blocks used by the COPS protocol are shown in FIG. 7 and its basic operation can be described as follows. A new Quality of Service session request is received by a Policy Enforcement Point (PEP)—this request can be an RSVP path message or in a preferred embodiment of the present invention a CR-LDP message, although COPS is intended to be protocol independent. The PEP now queries a Policy Decision Point (PDP) as to whether it should allow this new session to be set-up. The PDP issues a response and the PEP implements this—either to deny the new session or to allow it to be set-up. A local policy decision point (LPDP) 703 is also included in the model as a method of getting a quick response to a query. The LPDP is only allowed to issue temporary decisions, pending a response from the PDP. In a preferred embodiment of the present invention an admission manager performs the functions of a PDP and an endpoint that of a PEP.

Figure 8:
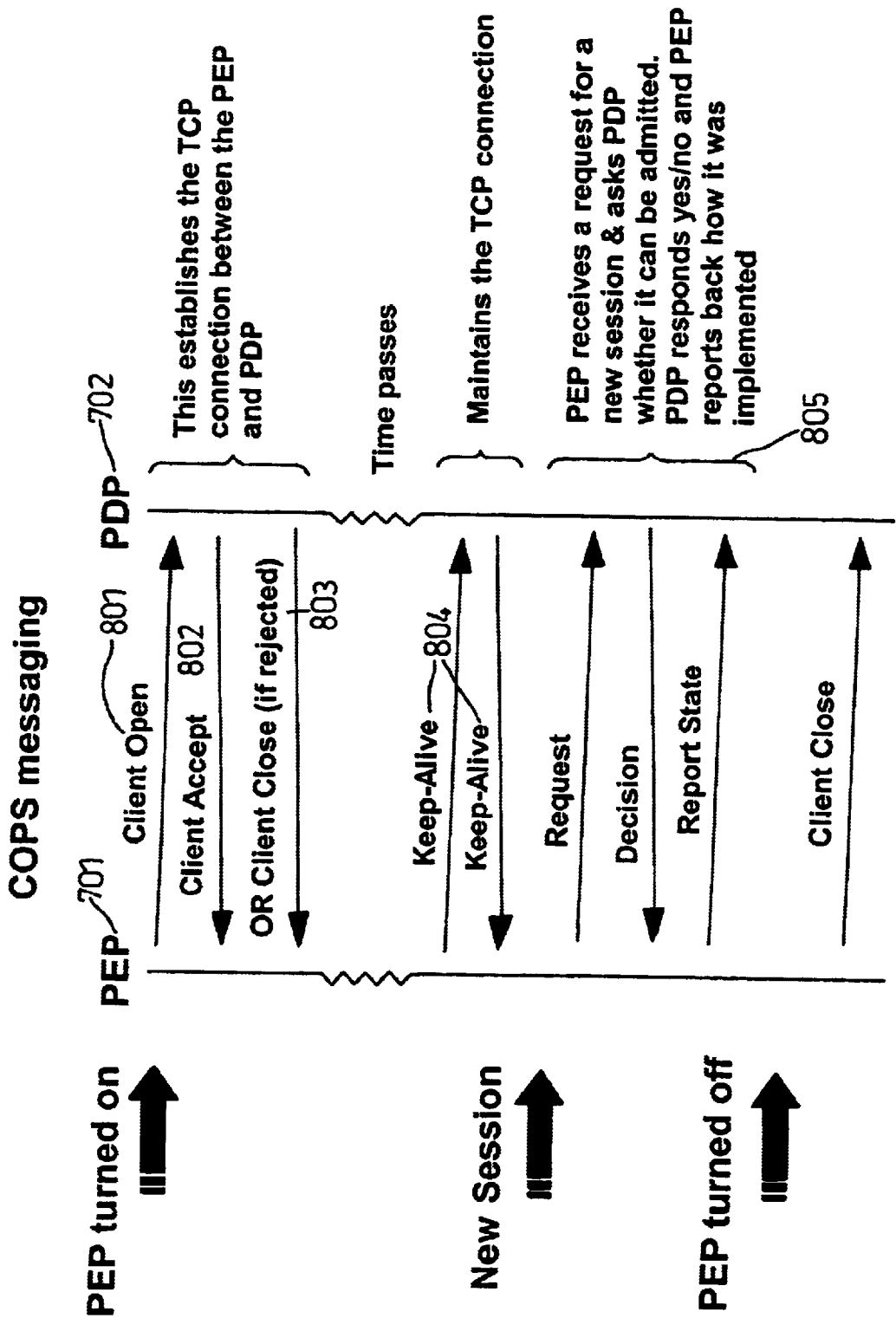
FIG. 8 is a flow diagram illustrating COPS messaging.

The COPS protocol uses a simple set of messages as illustrated in FIG. 8. Client Open 801, Client Accept 802, Client Close 803 and Keep Alive 804 are used to administer the connection from the PEP (Client) 701 to the PDP (Server) 702. New session requests are handled by a Request—Decision—Report State handshake 805. There is also a capability to synchronise the PDP and PEP with respect to the active sessions on the PEP.

Although COPS is a policy messaging protocol, it places no restriction on the type of policy information that it can exchange. In its role in the network described in this document, COPS is typically required to convey the information needed to establish a CR-LDP session over the interface between an endpoint and admission manager and between an admission manager and administrative server. In the former case, the endpoint issues a Request for a new session, with the Decision indicating failure or success and the parameters decided upon by SIP++ to use to set-up the session. In the Latter case, an admission manager requests a new tunnel in the MPLS core to be set-up by the Administrative Server. For example, this may be prompted by a Request from an endpoint.

In a preferred embodiment of the present invention, when COPS is used between a connection manager and an abstract node COPS messages carry a Call-ID as well as CR-LDP information. In this embodiment the protocol is used as a registration process, with all requests being granted under normal operation.

The CR-LDP Protocol

The standard CR-LDP (Constraint-based Routing Label Distribution Protocol) protocol is an extension of the basic LDP protocol used to establish labelled flows in MPLS networks. It is designed to allow traffic engineering methods to be applied to an MPLS network such that specific paths can be established through a set of chosen nodes with a particular Quality of Service. CR-LDP is a messaging based protocol that uses TLV (Type Length Value) elements to encode data.

The standard LDP protocol is used to establish label mappings at a label switch router (LSR) between incoming and outgoing label switch paths (LSPs). A particular LSR is able to request from a peer a label that can be used to specify the route to that LSR. MPLS is thus able to transport IP packets across a network in a hop-by-hop manner by swapping labels at each node in the network.

Figure 9:
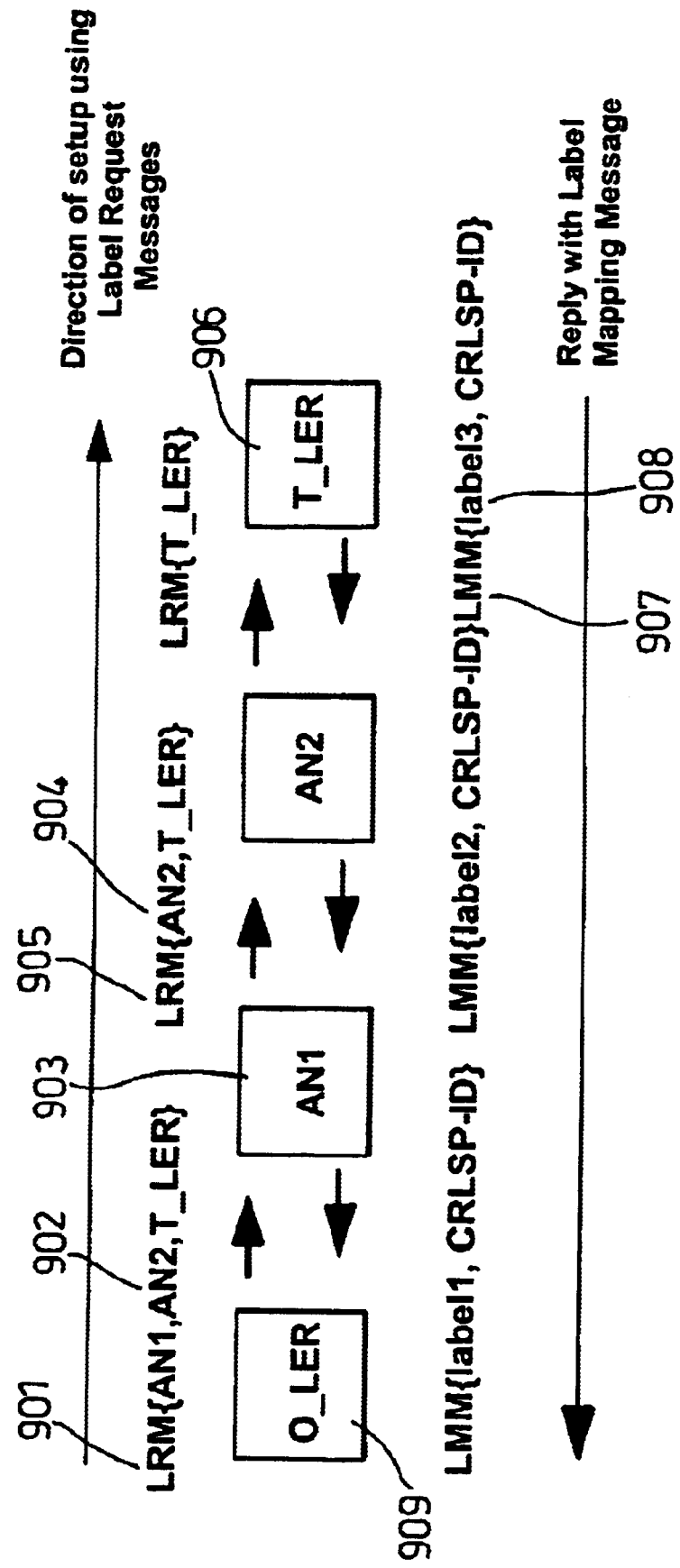
FIG. 9 is a flow diagram illustrating CR-LDP path set-up.

CR-LDP extends this to cover multiple hops in an MPLS network and its basic operation is illustrated in FIG. 9. A LSR issues a Label Request Message 901 which specifies the path 902 to be taken through the network and optionally the traffic characteristics, resource class, pinning options etc. for the path. The Label Request message is then sent to the first LSR 903 in the path. This can be an abstract node representation, though standard CR-LDP has no defined method for choosing which LSR to use if more than one reachable LSR is specified by an abstract node representation. By constraining the network, as described herein, by only allowing sessions to be established along pre-determined paths this problem is effectively dealt with.

When the next LSR is reached, it identifies itself as being the next LSR in the path and removes itself from the path description 904. It then checks that there is another hop specified for the path and the modified message 905 is forwarded. This processing occurs until the final LSR 906 in the specified path is reached. At this point a Label Mapping Message 907 is returned back across the network through each of the nodes traversed. Each upstream LSR in turn indicates a label to the downstream LSR to use over that hop of the MPLS network. The Downstream LSR adds this value into its routing table 908 and issues a similar message. This process continues back to the originating LSR 909, at which point the LSP is completely set-up and ready for use.

Once established, the path behaves as though it is a single hop between two LSRs 909, 906, regardless of how many LSRs are actually traversed. It may also be used in subsequent CR-LDP paths as one of the hops.

A preferred embodiment of the present invention uses CR-LDP almost entirely in this standard way. An exception is the preferred use of a Vendor-private TLV to convey the Call-ID information used to match up the CR-LDP reservation with the SIP++ session that provisioned the path.

Network Initialisation

The process of network initialisation is similar to the method used to establish a new link between Abstract Nodes. As noted above, although a link may exist between two groups of label switch routers (LSRs) which are grouped together to form an Abstract Node, the label switch path (LSP) established will be between two LSRs, one from each of the Abstract Nodes connected together.

The Administrative Server initialises the network link by link, sequentially establishing the high capacity LSPs to use over the network core. As soon as the link is active, its associated connection manager begins to advertise its presence to all other reachable nodes. As more links are established, the set of reachable nodes from each connection manager is increased until all links are present.

In FIG. 1 it can be seen that the endpoints 10, 11 do not have any high capacity links to their nearest abstract nodes 12, 14. Rather these connections are set-up on demand. The Administrative Server 35 therefore also initiates the forwarding of congestion information to an Endpoint 10, 11 from those Abstract Nodes which the endpoint 10, 11 is allowed to access as the first hop on a given path. The set of abstract nodes an endpoint can reach may be decided on a topological or bandwidth basis and are decided by the network provider. The Admission Manager 35 is then able to build up a picture of the paths available to it.

Should an Admission Manager 30, 31 need greater access to the MPLS network, it uses the COPS interface to the Administrative Server 35 to request access to another Abstract Node.

End to End Session Establishment

Figure 10:
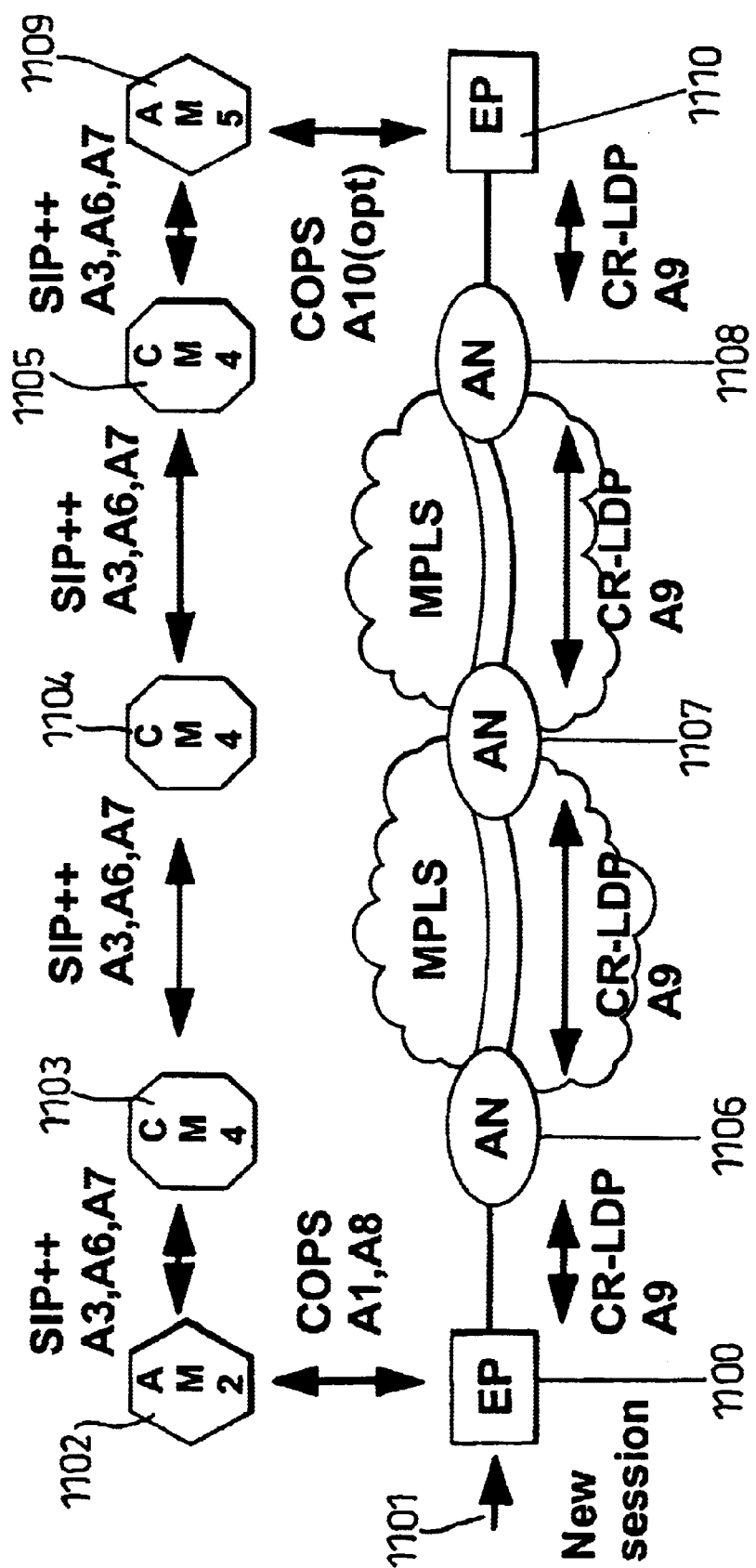
FIG. 10 is a flow diagram illustrating signalling during set-up of a communication session.

An example of the messaging used to establish a communication session across a communications network and provide a guaranteed quality of service is now described with reference to FIG. 10.

The first event is the arrival at an endpoint 1100 of a new session request 1101. There is no restriction on the type of request this can be, though it must obviously be one the endpoint 1100 understands. This causes the endpoint 1100 to send a COPS Request (labelled A1) to its associated Admission Manager 1102. Upon receipt of this Request, the Admission Manager 1102 determines the path or paths it will attempt to use to route the session to its destination. This may be either an explicit path or may use abstract nodes, depending on the amount of network topology information available to the Admission Manager 1102. Using its view of the network congestion and any associated route selection policies, the admission manager 1102 assigns a rank to each of the paths it has determined.

The Admission Manager 1102 then forms one INVITE message for each of the paths using the same Call-ID for each, but different Cseq values. Each INVITE message includes a path element, an associated rank and a traffic element in the message body. It will also include a session description message body. Each INVITE message is then sent A3 to each of the connection managers 1103, 1104, 1105 in turn that control Abstract Nodes 1106, 1107, 1108 in the specified path before finally reaching the destination admission manager 1109.

At each Connection Manager 1103, 1104, 1105 in the path, the path element of the INVITE message is interrogated for the next Abstract Node. The Connection Manager then determines if it has a label switch path (LSP) to that Abstract Node with sufficient free resource by comparison with the traffic element. If it has, it writes its SIP-URL into the Record-Route header of the INVITE message. The Connection Manager now adds a temporary soft-state reservation associated with the call-ID along the path and awaits confirmation. The Connection Manager may also choose to add a congestion message body to the message. The INVITE message is now forwarded to all Connection Managers whose Abstract Nodes were identified as suitable next hops using forking as described above. The final Connection Manager in the MPLS network implicitly performs an unforking operation by routing all INVITE messages to a single Admission Manager 1109. If the final Abstract Node 1108 is not described by an explicit address, an error response is generated.

If any of the traversed connection managers 1103, 1104, 1105 in the path have a next hop LSP which is currently too congested that connection manager responds with an 801/802 error response and ceases forwarding the INVITE message. The Record-Route header is used to route the response back. Any connection managers this error response traverses then update their congestion information accordingly. If the next hop LSP is not congested but unavailable for some other reason, an 803 response is sent and if the next abstract node in the path is simply unreachable from this connection manager, an 804 response is sent.

The destination Admission Manager 1109 eventually receives one or more INVITE messages. Upon receipt of the first INVITE message for a new session (i.e. an INVITE message that has an unrecognised Call-ID) a timer starts and all INVITE messages with the same Call-ID received within the time limit are processed. The Admission Manager 1109 then begins to form a 200 OK response. It uses the Record-Route headers of each incoming INVITE message to determine the path taken by that message. It ranks each of these paths and by convolution with the original ranking scores, it chooses a preferred path. Any suitable path weighting and cost algorithms may be used to help form the rank.

The destination admission manager 1109 now sends one 810 response per original INVITE message whose path was not used (i.e. one per CSeq value). It also then sends a 200 OK response for the chosen path, using the Record-Route header of the original to form the path element in the message body. The Record-Route is then also used to make a Route header. Finally, the Admission Manager 1109 stores the session description and Call ID before returning the 200 OK message A6. As this message traverses the connection managers 1105, 1104, 1103 listed in the Route header, it triggers the making of permanent reservations for the session at each traversed connection manager by up-dating the existing soft-state reservation.

On receipt of the 200 OK message, the originating Admission Manager 1102 closes the SIP++ negotiation process by sending an ACK message A7 back across the network using the chosen path as its route—gleaned from the received Route header. The receiving Admission Manager 1102 uses this ACK message to update its congestion information with the new session and as a confirmation of the path chosen. The originating Admission Manager 1102 also updates its path description for the session to reflect the chosen path.

The Originating Admission Manager 1102 now finally sends a COPS Decision A8 back to its endpoint 1100. This message contains the chosen, reserved, path to use in the subsequent CR-LDP session and the Call-ID. It may optionally include the traffic information as a failsafe check that the correct parameters are used. The Report State response may include the label issued by CR-LDP for this session. However, note this can only be sent after the CR-LDP protocol has set up the required path. Inclusion of the label issued by CR-LDP in the Report State response is useful if re-provisioning the path for a change in the session characteristics.

The Endpoint 1100 now starts a CR-LDP negotiation A9 using the path of explicit nodes 1106, 1107, 1108 and including the Call-ID as a vendor specific TLV. CR-LDP establishes a path through the specified LSRs. At the receiving Endpoint 1110, an optional COPS exchange A10 can be initiated to discover the label assigned to this new session so that a cut-through path can be established which maps the incoming label directly onto the correct forwarding path for the session.

A range of applications are within the scope of the invention. These include situations in which it is required to provide a guaranteed level of quality of service for a specified communication session over a communications network. For example, transmission of internet protocol messages over an MPLS communications network.

What is claimed is:

1. A method of establishing a connection between two endpoints in a communications network such that a specified level of quality of service is given for a specified communication session using the established connection, said method comprising the steps of:
　(i) determining a plurality of possible paths between the endpoints;
　(ii) determining a measure of preference for each of said possible paths by ranking each possible path on the basis of information about the communications network and information about the specified communication session;
　(iii) reserving bandwidth along the most preferred path according to said measures of preference; and (iv) establishing a connection over said most preferred path,
   wherein said communications network comprises a plurality of nodes connected together by links and wherein said method further comprises the ster of configuring the communications network such that the links between a first plurality of nodes are of a pre-determined capacity such that in use, each of said links between the first plurality of nodes is capable of sustaining a plurality of separate communication sessions.

2. A method as claimed in claim 1 wherein said step (ii) of determining a measure of preference for each of said possible paths further comprises the steps of:
   (i) for each of said possible paths, determining a first set of measures of preference on the basis of information about a region of the communications network around a first one of the two endpoints; and
   (ii) for each of said possible paths, determining a second set of measures of preference on the basis of information about a second region of the communications network around a second one of the two endpoints.

3. A method as claimed in claim 2 which further comprises the step of, for each possible path, respectively combining the first and second measures of preference for said each possible path.

4. A method as claimed in claim 1 wherein said most preferred path is arranged to comprise one or more of said links of pre-determined capacity.

5. A method as claimed in claim 2 wherein said communications network comprises a plurality of nodes connected together by links and wherein said method further comprises the step of configuring the communications network such that the links between a first plurality of nodes, located substantially between said first and second regions of the communications network, are of a higher capacity than other links.

6. A method as claimed in claim 1 wherein said communications network comprises a plurality of nodes which are arranged to broadcast information about topology and traffic levels associated with those nodes.

7. A method as claimed in claim 1 wherein said step of determining a plurality of possible paths comprises:
   (i) issuing one or more messages from a first one of the endpoints, said messages comprising information about the location of the second endpoint; and
   (ii) propagating each of said messages across the communications network to the second endpoint.

8. A method as claimed in claim 7 wherein said communications network comprises a plurality of nodes and wherein said method further comprises the step of:
   (i) for each of said messages, recording information in that message about the location of each node traversed by that message.

9. A method as claimed in claim 8 wherein each of said messages contains information about the communication session and wherein said method further comprises the step of:
   (i) for each of said messages, when a message traverses a node, making a reservation of bandwidth on a link emanating from that node.

10. A method as claimed in claim 9 wherein said reservations are cancelled unless confirmed within a specified time period.

11. A method as claimed in claim 1 wherein said communications session is for internet protocol traffic.

12. A communications network comprising at least two endpoints between which it is desired to establish a connection such that a specified level of quality of service is given for a specified communication session, said communications network comprising:
   (i) a processor arranged to determine a plurality of possible paths between the endpoints;
   (ii) a determiner arranged to determine a measure of preference for each of said possible paths on the basis of information about the communications network and information about the specified communication session;
   (iii) a reservation mechanism arranged to reserve bandwidth along the most preferred path according to said measures of preference; and
   (iv) a connection mechanism arranged to establish a connection over said most preferred path,
      wherein said communications network comprises a plurality of nodes connected together by links and wherein said processor is arranged to configure the communications network such that the links between a first plurality of nodes are of a pre-determined capacity such that in use, each of said links between the first plurality of nodes is capable of sustaining a plurality of separate communication sessions.

13. A communications network as claimed in claim 12 which is an internet protocol communications network.

14. A communications network as claimed in claim 12 which is an MPLS communications network.

15. A computer program stored on a computer readable medium said computer program being for controlling a communications network comprising at least two endpoints, said computer program being arranged to control said communications network such that:
   (i) a plurality of possible paths between the endpoints is determined;
   (ii) a measure of preference for each of said possible paths is determined on the basis of information about the communications network and information about a specified communication session;
   (iii) bandwidth is reserved along the most preferred path according to said measures of preference; and
   (iv) a connection over said most preferred path is established such that a specified level of quality of service is given for the specified communication session and wherein said communications network comprises a plurality of nodes connected together by links and wherein said method further comprises the step of configuring the communications network such that the links between a first plurality of nodes are of a pre-determined capacity such that in use, each of said links between the first plurality of nodes is capable of sustaining a Durability of separate communication sessions.

16. Apparatus for use in a communications network comprising at least two endpoints between which it is desired to establish a connection such that a specified level of quality of service is given for a specified communication session, said apparatus being associated with one of said endpoints and comprising:
   (i) a memory containing information about the topology of at least part of the communications network; and to record pre-configured links between a first plurality of interlinked nodes of the communications network which are of a pre-determined capacity such that in use, each of said links the nodes are capable of sustaining a plurality of separate communication sessions,
   (ii) an input arranged to receive a request for a specified communication session;

(iii) an output arranged to issue a plurality of request messages in response to a request for a specified communication session; each of said request messages comprising information about the specified communication session.

17. Apparatus as claimed in claim 16 which further comprises a determiner arranged to determine a measure of preference for each of said request messages.

18. Apparatus as claimed in claim 17 which is arranged to receive a plurality of request messages issued by another such entity.

19. Apparatus as claimed in claim 18 wherein said determiner is further arranged to determine a measure of preference for each of said received request messages.

* * * * *

UNITED STATES PATENT AND TRADEMARK OFFICE
CERTIFICATE OF CORRECTION

PATENT NO. : 6,678,264 B1
DATED : January 13, 2004
INVENTOR(S) : Gibson, Mark R.

It is certified that error appears in the above-identified patent and that said Letters Patent is hereby corrected as shown below:

Column 21,
Line 5, change "ster" to -- step --

Column 22,
Line 54, change "Durability" to -- plurality --

Signed and Sealed this

Twenty-eighth Day of September, 2004

JON W. DUDAS
*Director of the United States Patent and Trademark Office*